United States Patent
Hines

(10) Patent No.: US 10,628,833 B2
(45) Date of Patent: *Apr. 21, 2020

(54) COMPUTER ARCHITECTURE INCORPORATING BLOCKCHAIN BASED IMMUTABLE AUDIT LEDGER FOR COMPLIANCE WITH DATA REGULATIONS

(71) Applicant: TD PROFESSIONAL SERVICES, LLC, Fountain Hills, AZ (US)

(72) Inventor: Scott Hines, Fountain Hills, AZ (US)

(73) Assignee: TD PROFESSIONAL SERVICES, LLC, Fountain Hills, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,741

(22) Filed: Apr. 2, 2019

(65) Prior Publication Data

US 2019/0295102 A1 Sep. 26, 2019

Related U.S. Application Data

(63) Continuation of application No. 15/934,720, filed on Mar. 23, 2018, now Pat. No. 10,304,062.

(51) Int. Cl.
| | |
|---|---|
| *G06Q 30/00* | (2012.01) |
| *G06F 21/64* | (2013.01) |
| *G06F 21/62* | (2013.01) |
| *G06F 21/60* | (2013.01) |
| *H04L 9/06* | (2006.01) |
| *H04L 9/32* | (2006.01) |

(52) U.S. Cl.
CPC ......... *G06Q 30/018* (2013.01); *G06F 21/602* (2013.01); *G06F 21/6254* (2013.01); *G06F 21/64* (2013.01); *H04L 9/0637* (2013.01); *H04L 2209/38* (2013.01)

(58) Field of Classification Search
CPC . G06Q 30/018; G06F 21/6254; G06F 21/602; H04L 9/0637
USPC .................................................. 707/602, 687
See application file for complete search history.

(56) References Cited

U.S. PATENT DOCUMENTS

| | | |
|---|---|---|
| 9,774,578 B1 | 9/2017 | Ateniese et al. |
| 2002/0023109 A1 | 2/2002 | Lederer et al. |

(Continued)

OTHER PUBLICATIONS

International Searching Authority, International Search Report and Written Opinion for corresponding International Application No. PCT/US2019/023564, dated May 30, 2019, 9 pages.

*Primary Examiner* — Michael Pham
(74) *Attorney, Agent, or Firm* — Gordon Rees Scully Mansukhani LLP; David R. Heckadon

(57) ABSTRACT

A computer system architecture and method for providing compliance with data regulations, by: (a) collecting a data input stream with a data collection terminal; (b) using a compliance device driver resident in the data collection terminal to: (1) select data corresponding to pre-identified data compliance fields, and (2) apply a compliance markup language parser to generate pseudonymized data; and (c) using an automated compliance network appliance and an automated compliance server to: (1) transmit the pseudonymized data into immutable audit ledger, wherein the immutable audit ledger is assembled and verified by blockchain, and (2) transmit the data input stream into a data lake; (d) hosting access portals for accessing data: (1) stored in the data lake, and (2) stored in the immutable audit ledger.

22 Claims, 9 Drawing Sheets

(56) References Cited

U.S. PATENT DOCUMENTS

| | | |
|---|---|---|
| 2003/0028514 A1 | 2/2003 | Lord et al. |
| 2017/0011460 A1 | 1/2017 | Molinari et al. |
| 2017/0046693 A1 | 2/2017 | Haldenby et al. |
| 2017/0097950 A1 | 4/2017 | Meacham et al. |
| 2017/0109735 A1 | 4/2017 | Sheng et al. |
| 2018/0082024 A1 | 3/2018 | Curbera et al. |
| 2018/0088928 A1 | 3/2018 | Smith et al. |
| 2018/0152289 A1 | 5/2018 | Hunt et al. |
| 2018/0158050 A1 | 6/2018 | Chenard et al. |
| 2018/0374097 A1* | 12/2018 | Hanna .................. H04L 9/0891 |
| 2019/0295114 A1* | 9/2019 | Pavletic ................ G06Q 50/01 |

* cited by examiner

```
                                                       13
                                                        ╲

DATA CONTROLLER NAME
              DATA CONTROLLER ADDRESS ─────────────── 37

<GDPR> ─────────────────────────────────────────────── 38

<Element name="Subject Name" passthrough="yes"> ────── 39
Jane Doe ──────────────────────────────────────
                                                      40
</Element> ──────
                                                      41

<Element name="Phone Number" passthrough="no"> ─────── 42
1-201-555-1212 ──────────
                                                      43
</Element>

</GDPR> ────────────
                                                      44
Item        Desc        Qty         Amount
                                                      45
xxxx        xxxxxxx     1           100.00

Subtotal    100.00
```

DATA CONTROLLER NAME
DATA CONTROLLER ADDRESS

Jane Doe

| Item | Desc | Qty | Amount |
|------|------|-----|--------|
| xxxx | xxxxxxx | 1 | 100.00 |
| | | Subtotal | 100.00 |

Figure 8

COMPUTER ARCHITECTURE INCORPORATING BLOCKCHAIN BASED IMMUTABLE AUDIT LEDGER FOR COMPLIANCE WITH DATA REGULATIONS

CROSS-REFERENCES TO RELATED APPLICATIONS

This application is a Continuation and claims the benefit of U.S. patent application Ser. No. 15/934,720, of same title, filed Mar. 23, 2018, the entire disclosure of which is incorporated herein by reference in its entirety for all purposes.

TECHNICAL FIELD

The present invention relates to computer architectures that automatically comply with data regulations by generating or employing immutable audit ledgers. The present invention also relates to computer systems that effectively comply with data processing regulations including, but not limited to, the European Union's General Data Protection Regulation (GDPR).

BACKGROUND OF THE INVENTION

On 27 Apr. 2016, the European Union passed The General Data Protection Regulation (GDPR) (Regulation (EU) 2016/679). The GDPR is a regulation by which the European Parliament, the Council of the European Union and the European Commission intend to strengthen and unify data protection for all individuals within the European Union (EU). The regulation is extra-territorial and extends the scope of the EU data protection law to all foreign companies processing data of EU residents.

The regulations go in to effect on 25 May 2018 and require organizations that collect, process, or control (the "Data Controllers") personal data from EU residents (the 'Data Subjects") to comply with the regulations. The scope of the of regulations is quite wide. For example, according to the European Commission "personal data" is any information relating to an individual, whether it relates to his or her private, professional or public life. It can be anything from a name, a home address, a photo, an email address, bank details, posts on social networking websites, medical information, or a computer's IP address.

The GDPR specifically requires Data Controllers to: (i) implement effective measures to comply with the regulations and, (ii) be able to demonstrate evidence of the compliance of processing activities. The regulations place a very significant and expensive burden on Data Controllers. Data Controllers are required to:

BREACH NOTIFICATION—Notify Data Subjects within 72 hours of first having become aware of the breach.

OBTAIN VALID CONSENT—Valid consent must be explicit for data collected and the purposes data is used. Data controllers must be able to prove "consent" (opt-in) and consent may be withdrawn.

RIGHT TO ACCESS—Provide Data Subjects with confirmation as to whether or not personal data concerning them is being processed, where and for what purpose. Further, the controller shall provide a copy of the personal data, free of charge, in an electronic format.

RIGHT TO BE FORGOTTEN—Allow the Data Subject to have the data controller erase his/her personal data, cease further dissemination of the data, and potentially have third parties halt processing of the data.

DATA PORTABILITY—Provide the right for a data subject to receive the personal data concerning them, which they have previously provided in a 'commonly use and machine-readable format' and have the right to transmit that data to another controller.

The GDPR places significant financial burden and liability on Data Controllers. Independent research suggests that companies will spend an average of $1.4 million on systems and training to comply with the GDPR. Fundamental limitations in current data processing technology are the primary an obstacle to GDPR compliance. Many organizations simply don't have the appropriate technology to manage data effectively. The penalties for breach of GDPR are very severe. Data Controllers found in breach can be fined up to 4% of annual global turnover or €20. Million (whichever is greater). Companies, such as retailers and hotels that collect large amounts of consumer data are particularly exposed to GDPR compliance costs and liabilities.

What is now desired is a computer system architecture that ensures automatic seamless compliance with GDPR data regulations. Ideally, such a computer system architecture would permit the data subjects themselves to access the data being stored about them, yet also permit merchants, financial, medical and academic professionals (and others) to only access pseudonymized data about the data subjects (thereby maintaining the data subjects' privacy and anonymity). Ideally as well, such a computer system architecture would seamlessly and automatically generate an auditably verified record in a timely fashion that the data stored therein complies with data processing regulations such as GDPR. As will be shown below, the present computer architecture provides such a system.

SUMMARY OF THE INVENTION

In a first aspect, the present system provides a computer system architecture for providing compliance with data regulations, comprising: (a) a data collection terminal configured to receive a data input stream; (b) a compliance device driver resident in the data collection terminal that: (1) selects data in the data input stream that corresponds to pre-identified data fields, wherein the pre-identified data fields are determined by data compliance regulations, and (2) applies a compliance markup language parser to the selected data, thereby generating pseudonymized data; and (c) an automated compliance network appliance in communication with the compliance device driver, the automated compliance network appliance: (1) receiving the pseudonymized data generated by the compliance driver, and (2) transmitting the pseudonymized data to the Internet; and (3) receiving the data input stream from the data collection terminal, and (4) transmitting the data input stream to the Internet; and (d) an automated compliance server, the automated compliance server: (1) receiving the pseudonymized data from the Internet, and (2) storing the pseudonymized data in immutable audit ledger by using a private blockchain system, (3) receiving the data input stream from the Internet, and (4) storing the data input stream in a data lake.

In another aspect, the present system includes a method of providing an auditable record showing transaction compliance with data regulations, by: (a) collecting a data input stream with a data collection terminal; (b) selecting data in the data input stream that corresponds to pre-identified data fields, wherein the pre-identified data fields are determined by data compliance regulations; (c) applying a compliance markup language parser to the selected data, thereby generating pseudonymized data; (d) transmitting the pseudonymized data into a blockchain based immutable audit ledger; (e) transmitting the data input stream into a data lake; (f) hosting a portal for accessing data stored in the data lake; and (g) hosting a portal for accessing data stored in the immutable audit ledger.

A first advantage of the present system is that it utilizes blockchain technology to reliably generate the immutable audit ledger. An advantage of a blockchain system is that the immutable audit ledger meets legal standards of data security. The immutable audit ledger is preferably generated by utilizing a private blockchain in which blocks are added to the blockchain after they have been verified by dedicated miners. A "proof of complexity" problem solving system is used. This approach advantageously allows dedicated miners to solve the mathematical problem rapidly enough to allow the miners to achieve consensus within a desired time frame, while still providing sufficient randomness in the selection of the miner awarded the right to write the block. The immutable audit ledger thereby provides an auditable data registry that certifies that the data stored in the data lake is correct and unaltered.

Preferably, the automated compliance network appliance transmits data to the Internet in batches such that it is pre-prepared for the blockchain miners. An advantage of sending data in batches to a group of pre-selected private miners is that the blocks can be solved (i.e.: consensus can be achieved between the miners) and written faster (as compared to using individual data transmissions and a public blockchain approach). This feature of the present system is very advantageous since GDPR regulations only give Data Controllers 72 hours to report data breaches.

In preferred aspects, the automated compliance application server hosts a portal for accessing the data stored in the data lake such that the Data Subjects (i.e.: the persons about whom the data has been stored) can access data about themselves, and then delete, modify or transfer the data. In addition, the automated compliance application server also hosts a portal for accessing the data in the immutable audit ledger such that an auditor, merchant, financial professional or medical professional (or other $3^{rd}$ parties) can access the pseudonymized data stored in the immutable audit ledger. Thus, data privacy is maintained such these $3^{rd}$ parties cannot access the full sets of all of the data stored corresponding to each data subject. Optionally, the pseudonymized data may itself be encrypted.

Another advantage of the present computer architecture is that it permits data regulation auditors to access an immutable ledger of the pseudonymized data, thereby confirming compliance with the data regulations. Specifically, auditors can view the compliance data without requiring access to any of the private information or systems, yet can still coordinate, communicate and collaborate with the owners and operators of the present computer architecture system.

In various aspects, the data collection terminal may be a point of sale terminal, a webpage, a cash register, a check-in counter, a hand-held mobile device, an API, or any other suitable device. In preferred aspects, the data collection terminal is also payment cardholder information (PCI) complaint. The data collection terminal optionally comprises a data input device and a data output device. The data output device shows the collected data to the person about whom the data has been collected. For example, the data output device may simply be a receipt printer (which prints details of the sales transaction). Alternatively, the data output device may be a web page that displays this information. The receipt or webpage can have both the gathered data thereon, and a statement that the data has been gathered.

Preferably, the automated compliance network appliance has a processor, and memory with local storage that assembles data into blocks for transmission to the Internet. Optionally, the automated compliance network appliance may be a USB drive or a router.

The pre-identified data fields are preferably pre-stored in the compliance device driver and preferably correspond to personal information data, including, but not limited to: names, addresses, photos, email addresses, bank details, financial information, posts on social networking sites or apps, medical information, computer IP addresses, purchase information, agreements, academic records, travel records, or government and public services records. The compliance markup language parser determines which data is to be sent to the data output device, and which data is administered by which regulatory agency.

Although the present system can be used for GDPR data regulations, it is to be understood that it can also be used for other data regulation schemes including, but not limited to: Health Insurance Portability And Accountability Act (HIPPA) data regulations, or Financial Industry Regulatory Authority (FINRA) data regulations, any other data regulations or even just updates to any such data regulations. It is to be understood that the present system can be used with any regulatory compliance standard that requires that evidence of compliance be maintained in an immutable data storage this is: accessible to public stakeholders, shows that the regulatory requirements were performed according to published requirements of the standard, yet still shields private information from public stakeholders.

BRIEF DESCRIPTION OF THE DRAWINGS

FIG. 7 illustrates the use of compliance markup language to generate a printed sales receipt.

FIG. 8 illustrates an exemplary printed sales receipt (12 in FIG. 2) that has been generated using the compliance markup language of FIG. 7.

DETAILED DESCRIPTION OF THE DRAWINGS

Figure 1:
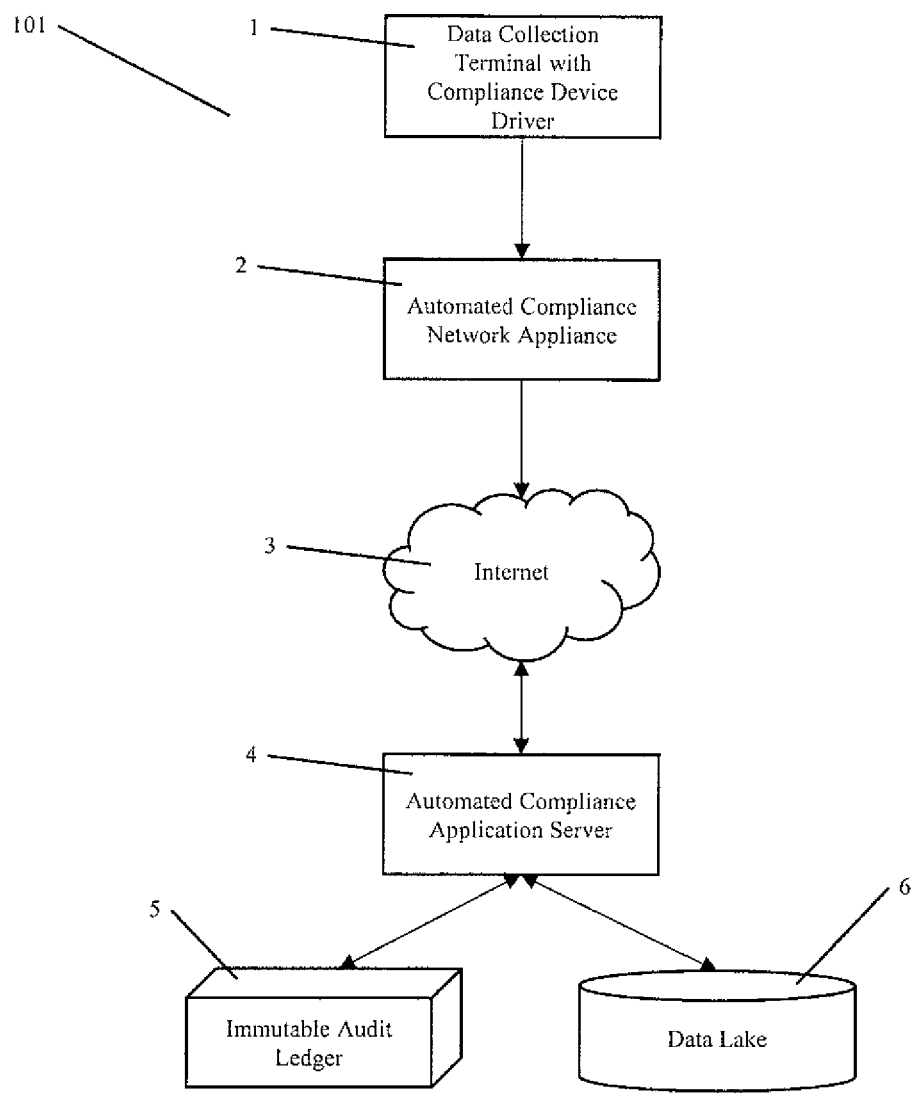
FIG. 1 is a system diagram of the present invention.

Referring first to FIG. 1, an overview of computer architecture 101 for providing compliance with data regulations is provided, as follows.

A data collection terminal 1 is configured to receive a data input stream. A compliance device driver (9 in FIG. 2) is resident in data collection terminal 1. The compliance device driver 9 performs the following two functions.

Figure 2:
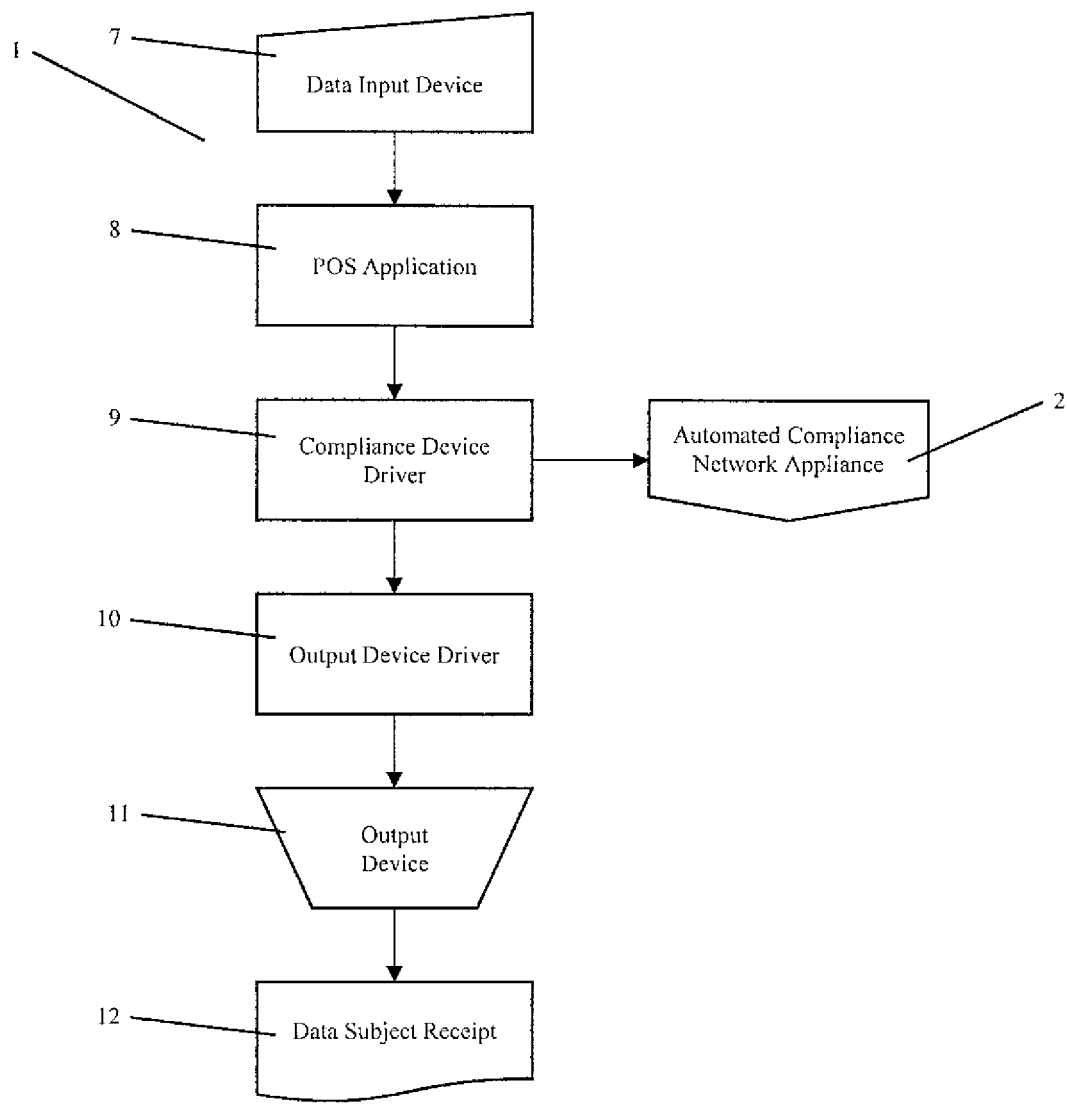
FIG. 2 is a system diagram showing further details of the compliance enabled data collection terminal of FIG. 1.

First, it selects data in the data input stream that corresponds to pre-identified data fields. The pre-identified data fields are determined by data compliance regulations. For example, in the case of GDPR, suitable data fields may include: names, addresses, photos, email addresses, bank details, financial information, posts on social networking sites or apps, medical information, computer IP addresses, purchase information, agreements, academic records, travel records, or government and public services records. It is to be understood that this list is merely exemplary and that other data fields could also be used, all keeping within the scope of the present system. These pre-identified data fields are preferably pre-stored in the compliance device driver 9 (FIG. 2). Preferably, these pre-identified data fields correspond to privacy data regulations (including, but not limited to GDPR, HIPPA and FINRA data regulations, or even top updates of such privacy regulations). The data input stream can comprise data about can be purchases, restaurant bills, legal agreements, academic grades, financial transactions, travel locations and itineraries, etc.

Figure 3:
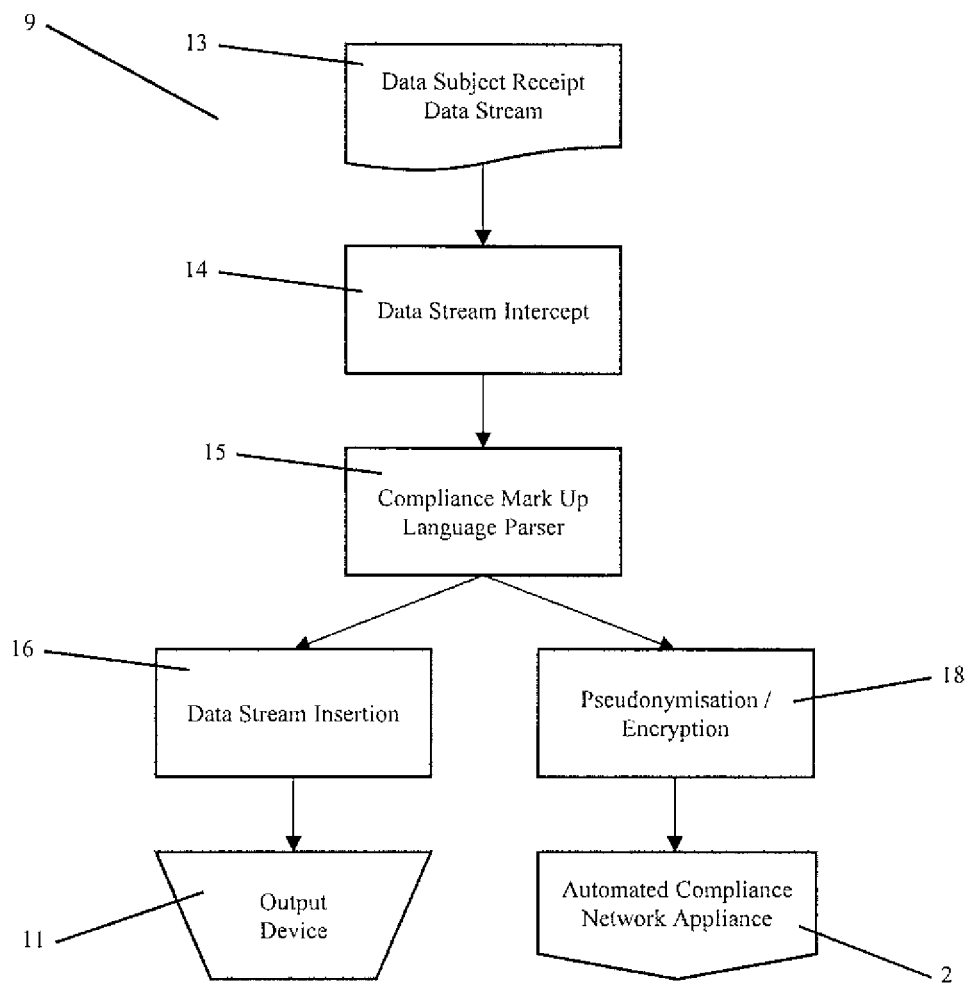
FIG. 3 is a system diagram showing further details of the compliance device driver of FIG. 1.
Figure 6:
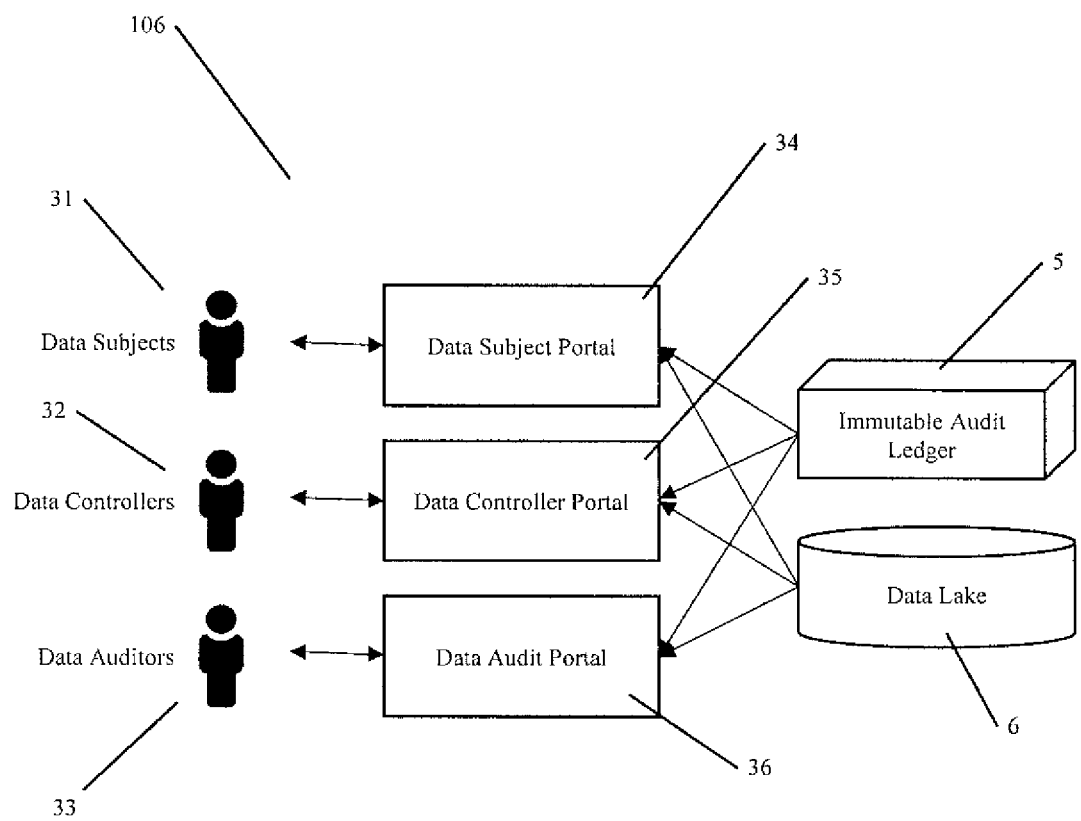
FIG. 6 is a system diagram of the automated compliance application server stakeholder interfaces.

Second, the compliance device driver 9 applies a compliance markup language parser (15 in FIG. 3) to the selected data, thereby generating pseudonymized data. As understood herein, "pseudonymized data" is data in which most of the identifying fields within a data record are replaced within one or more artificial identifiers, or pseudonyms, thereby rendering the data less identifying to provide for greater Data Subject privacy. Specifically, as seen in FIG. 3, the compliance markup language parser 15 scans the data subject receipt data stream 13 and identifies compliance markup language tags that are embedded within data stream 13 as defined by a data controller 32 (FIG. 6). The compliance markup language tags instruct the compliance markup language parser 15 to identify, categorize, and forward data elements within the data stream to automated compliance network appliance 2.

As can be seen, the automated compliance network appliance 2 is in communication with compliance device driver 9 within data collection terminal 1. Automated compliance network appliance 2 both receives and transmits data. Specifically, it receives the pseudonymized data generated by the compliance driver 9 and then transmits the pseudonymized data to the Internet 3. The automated compliance network appliance 2 also receives the data input stream from the data collection terminal (7 in FIG. 2), and transmits this data input stream to the Internet 3. Thus, both data streams (i.e.: the full data input stream and the pseudonymized data) can be transmitted over the Internet. Optionally, the automated compliance network appliance 2 can use artificial intelligence or machine learning to predict events of interest to data controller 32, data auditor 23, or other stakeholders. For example, such events can include events that have a high probability of fraud (e.g.: unusual purchases), or a high probability of lack of compliance to the regulatory regime in force. Moreover, events of interest can also be operational events such as the need to reorder products or supplies, a need to update financial or labor forecasts, or any other key business process.

Next, an automated compliance server 4 receives both the pseudonymized data and the data input stream from the Internet 3. As will be fully explained below, automated compliance server 4 then stores the pseudonymized data in immutable audit ledger 5 using a blockchain based approach. As will also be explained, automated compliance server 4 also stores the data input stream in data lake 6.

FIG. 2 shows further details of the data collection terminal with compliance device driver 1, as follows. In various aspects, data collection terminal 1 can include any suitable data input device 7 for collecting data, including, but not limited to, a point of sale terminal, a webpage, a cash register, a check-in counter, a hand-held mobile device, or an API.

Preferably, data collection terminal 1 comprises a data input device 7 and a data output device 11. In operation, data output device 11 provides the data from the data input stream to the person about whom the data has been collected. For example, data output device 11 can simply be a receipt printer (which prints the sales transaction receipt 12 thereon). Alternatively, data output device 11 can be a web page which simply displays the information of the person about which it is collected (e.g.: a webpage displaying a transaction confirmation). Output device driver 10 sends the data to output device 11.

In operation, the compliance markup language parser 15 determines which data is to be sent to data output device 11. It is to be understood that not all data that is collected in the input data stream needs to be printed onto receipt 12 (or displayed on a webpage). For example, a sales receipt need not have the purchaser's address or phone number printed thereon. Additionally, the compliance markup language parser 15 determines which data is to be sent to automated compliance network appliance 2.

In optional preferred aspects, the data collection terminal includes a Point Of Sale (POS) Application 8 therein. In preferred aspects, POS Application 8 may be Payment Cardholder Information (PCI) complaint. As a result, no extra time is spent to achieve PCI compliance (since the data handling will already be PCI compliant before the data is entered into blocks in the present blockchain system). The present system can thus be implemented without having to redo its PCI compliance.

FIG. 3 shows further structural details of compliance device driver 9 in FIG. 2, as follows. First, the full data stream 13 relating to a data subject is received. Next, at 14, the data stream is intercepted via a piping instruction that re-directed the data stream to the compliance markup language parser 15. After processing by parser 15, the data is then directed into output device 11. Compliance markup language parser 15 performs pseudonymization (and optionally encryption as well) at 18, thereby sending pseudonymized data to automated compliance network appliance 2. (In the absence of data stream intercept 14, the data would instead simply pass directly into output device 15 without being pseudonymized).

Figure 4:
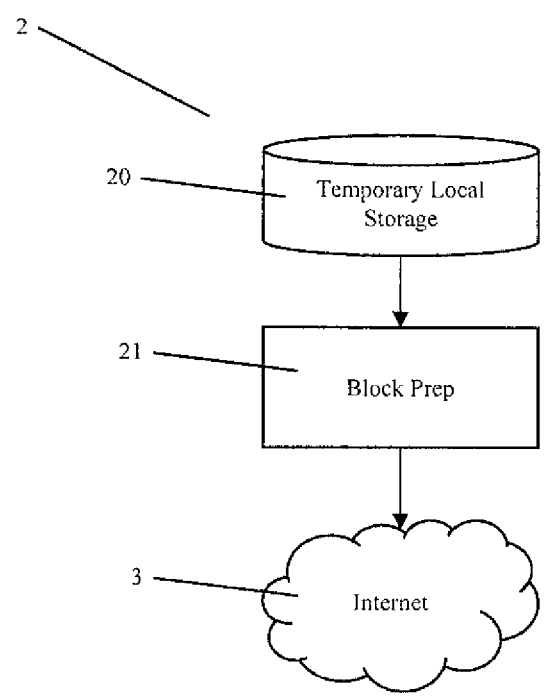
FIG. 4 is a system diagram showing further details of the automated compliance network appliance of FIG. 1.

FIG. 4 shows further structural details of automated compliance network appliance 2 in FIG. 1, as follows. Preferably, automated compliance network appliance 2 comprises a processor, memory and local storage. The Automated Compliance Network Appliance should provide at least two network interface ports to provide a secure bridge of communication between the private network connecting the data collection terminals 1 and the public Internet 3. Optionally, the network connection between data collection terminal 1 and automated compliance network appliance 2 could be replaced by a temporary data storage device that could be connected to data collection terminal 1 and could emulate automated compliance network appliance 2. This temporary storage device would then provide temporary storage of the compliance transactions collected from data collection terminal 1. This temporary storage device could then be removed from the connection to the data collection terminal 1 and connected to automated compliance network appliance 2. Upon connection to automated compliance network appliance 2, the temporary storage device would download the stored compliance transactions to be processed by the system in accordance with the processing requirements defined by data controller 32 in the same manner as if the transactions had been collected from a data collection terminal 1 connected directly to automated compliance network appliance 2. The use of the temporary data storage device supports the operation of a data collection terminal 1 in an off-line mode when it is not possible for the data controller 32 to operate data collection terminal 1 in an environment where it is connected directly to the automated compliance network appliance 2.

Automated compliance network appliance 2 includes a temporary local storage 20 into which the data is received. Next, at 21, blockchain block preparation is done. Specifically, automated compliance network appliance 2 at step 21 assembles the data that is to be used to form the immutable audit ledger 5 into batches for transmission to the Internet 3. By sending the data in batches to the internet, the blockchain miners are able to verify blocks and add them to the blockchain faster. If the data was not sent in batches to the blockchain miners, the blockchain miners will be required to validate each data subject transaction one by one.

Figure 5:
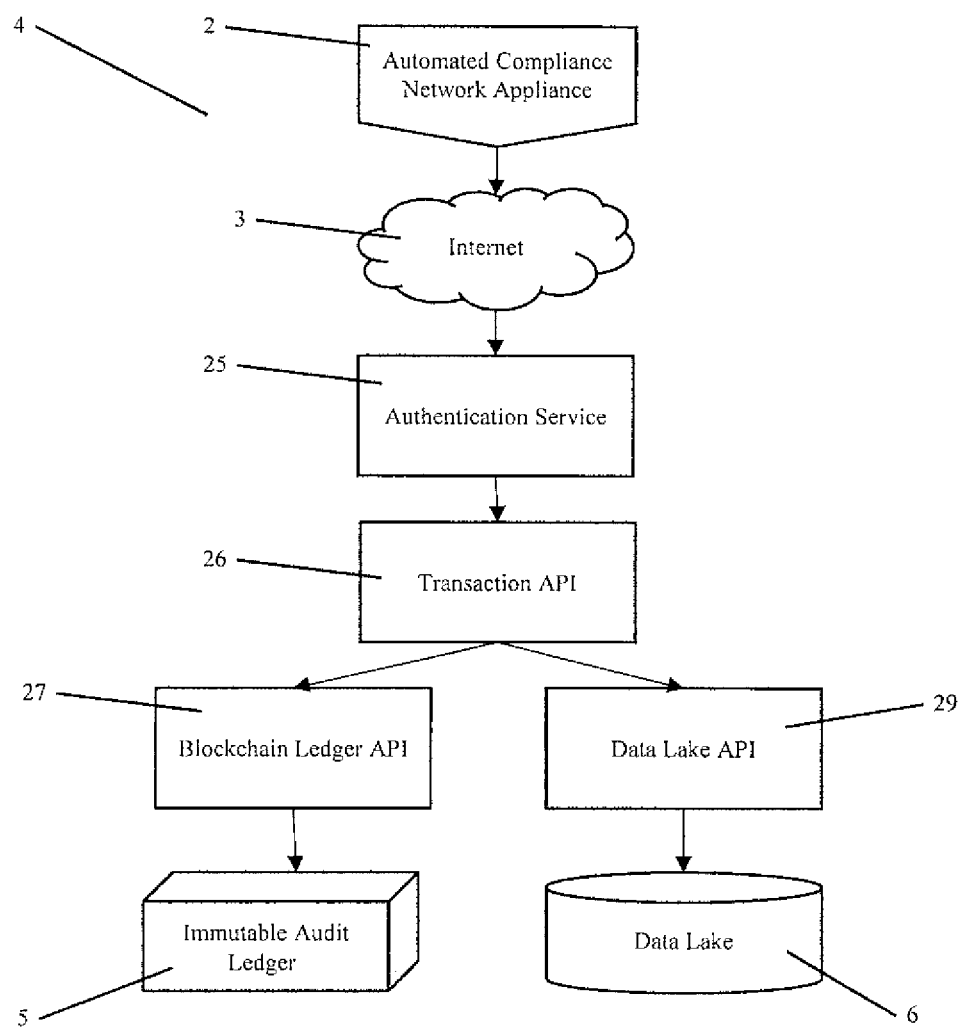
FIG. 5 is a system diagram showing further details of the data transactions between the automated compliance application server and both the immutable audit ledger and the data lake of FIG. 1.

FIG. 5 shows further details of the data transactions between the automated compliance application server 4 and both the immutable audit ledger 5 and data lake 6, as follows. Preferably, automated compliance application server 4 comprises an authentication service 25 that verifies the identity of the automated compliance network appliance 2 and ensures that it has been approved by the data controller 32 to connect to and exchange data with the transaction API 26. Multiple methods of authentication may be utilized by the present system, all keeping within the scope of the present invention. Next, the transaction API 26 operates to expose a set of methods that may be called by the automated compliance network appliance 2 to support the data processing compliance policies determined by data controller 32. These API methods can include multiple data processing functions such as separating the full data stream from the pseudonymized data (and direct the pseudonymized data into blockchain API 27, and direct the full collected data into data lake API 29).

The blockchain ledger API 27 exposes methods supported by the blockchain such that transaction API 26 is able to pass to the blockchain data elements and transaction registrations to be stored in immutable audit ledger 5. Blockchain ledger API 27 also exposes methods to the data subject portal 34, data controller portal 35 and data audit portal 36 (see FIG. 6) such that these stakeholder interfaces are able to query, select, and process data maintained in the immutable audit ledger 5.

Preferably, the blockchain is a private blockchain that uses a proof of complexity problem/solution to write individual blocks to the chain. Such a blockchain would provide an immutable audit ledger that provides an auditable data registry that certifies that the data stored in data lake 6 is correct and unaltered. Thus, the present blockchain would advantageously meet legal evidentiary standards.

In operation, the validated transactions are recorded by the miners on a shared distributed ledger. Specifically, whichever miner solves the proof of complexity problem first will get to write the block (after independent verification of the block by the other miners).

By using a private or permissioned blockchain with a private field of miners (i.e.: a blockchain system in which anyone can read, but only pre-selected members can record transactions to the blockchain), the required proof of complexity can be reduced. This is very advantageous in reducing the time required to verify and add blocks to the chain. GDPR regulations require 72 hour notice to Data Subjects after a data breach has occurred. In accordance with the present private blockchain system, miner consensus on blocks may be achieved (for example) in as little as 12 hours, and potentially less time. It is to be understood, of course, that the average time to solve and write the blocks will depend both upon the specific numerical problem the miners are assigned and the number of miners working on the problem. In accordance with the present system, proof of work (i.e.: solving computationally intense mathematical problem), proof of complexity and proof of stake consensus modeling (which uses less resources) can be used. Another advantage of using private minors is that you don't have to pay them.

The blockchain derived, immutable audit ledger 5 certifies that the data in data lake 6 is unaltered. Specifically, each line in ledger 5 contains a timestamp, and may contain transaction type, specific IDs for customer and retailers, a transaction ID from the data lake, and a hash value associated with the contents. Ledger data is hashed together and the collection of the hashes is grouped into a block. The contents of each block is then hashed with the hash of the previous block. The blocks are then validated by other blockchain miners. The hash stored in the blockchain can be compared to the hash of the transaction in the data lake to verify that the contents of the data lake have not been changed.

FIG. 6 illustrates various portals 34, 35 and 36 hosted by the automated compliance application server 4 for either accessing the data stored in data lake 6, or the data in immutable audit ledger 5, as follows.

First, portal 34 allows a data subject 31 to access data about themselves stored in the data lake. Specifically, this portal preferably allows the data subject 31 to delete, modify or transfer data about themselves stored in the data lake.

Second, portal 35 that allows access to the immutable audit ledger can be used for an auditor, merchant, financial professional, medical professional, educator (or other third party) to access the pseudonymized data that is stored in the immutable audit ledger.

Third, portal 36 allows the data controller (i.e.: "system administrator") to access to both data stored either in the immutable audit ledger 5 or in the data lake 6.

The present system also provides a method of providing an auditable record showing transaction compliance with data regulations, by: (a) collecting a data input stream with a data collection terminal 1; (b) selecting data in the data input stream that corresponds to pre-identified data fields, wherein the pre-identified data fields are determined by data compliance regulations; (c) applying a compliance markup language parser 15 to the selected data, thereby generating pseudonymized data; (d) transmitting the pseudonymized data into an immutable audit ledger 5; (e) transmitting the data input stream into a data lake 6; (f) hosting a portal 35/36 for accessing data stored in data lake 6; and (g) hosting a portal 34 for accessing data stored in the immutable audit ledger 5.

In accordance with this method, portal 34 hosted for accessing data stored in the data lake allows a data subject to access data about themselves, and delete, modify or transfer the data. Similarly, portal 35 hosted for accessing data stored in the immutable audit ledger allows an auditor, merchant, financial professional or medical professional to access data stored in the immutable audit ledger. Thus, the portal access will depend on the "role" of the person or agency seeking access.

FIG. 7 illustrates the use of compliance markup language on data stream (13 in FIG. 3) to generate a printed sales receipt, and FIG. 8 illustrates an exemplary printed sales receipt (12 in FIG. 2) that has been generated using the compliance markup language of FIG. 7, as follows.

In FIG. 7, an exemplary data subject receipt data stream 13 can include a document header 37 that has content out of scope of GDPR or other data regulation. This data content passes through compliance language parser 15 without any effect on the data stream. An opening compliance tag 38 and a closing compliance tag 44 define the opening and closing boundaries for data elements that fall within the scope of GDPR or other data regulation. (For example, 40 shows content within scope). Tags 38 and 44 are user defined by data controller 32 and may designate regulatory compliance regulations. Opening tag 38 may be nested within other opening tags if the data controller determines that certain data contents falls within the scope of multiple regulatory agencies. An opening element tag 39 designates content that must be recorded in immutable audit ledger 5 and data lake 6. Tag 39 can be used to name data elements and set their pass-through behavior in data stream insertion module 16 (FIG. 3). Tag 40 designates the end of stream content that was opened by tag 39. Data 40 between tags 39 and 41 passes into output device 11 without compliance language parser 15 operating on it. This data can then, for example, be printed directly on the sales receipt 12 (FIGS. 8 and 2). Conversely, data 43 between opening tag 42 and closing tag 44 does not pass directly out of the system and onto a sales receipt. Instead, this data is acted upon by compliance language parser 15, and is sent to data lake 6 and is also pseudonymized and sent into immutable audit ledger 5. At 45, the document body and footer show data that is out of scope of GDPR (or other data regulation). This data also passes through compliance language markup parser 15 without effect on the data stream.

Figure 9:
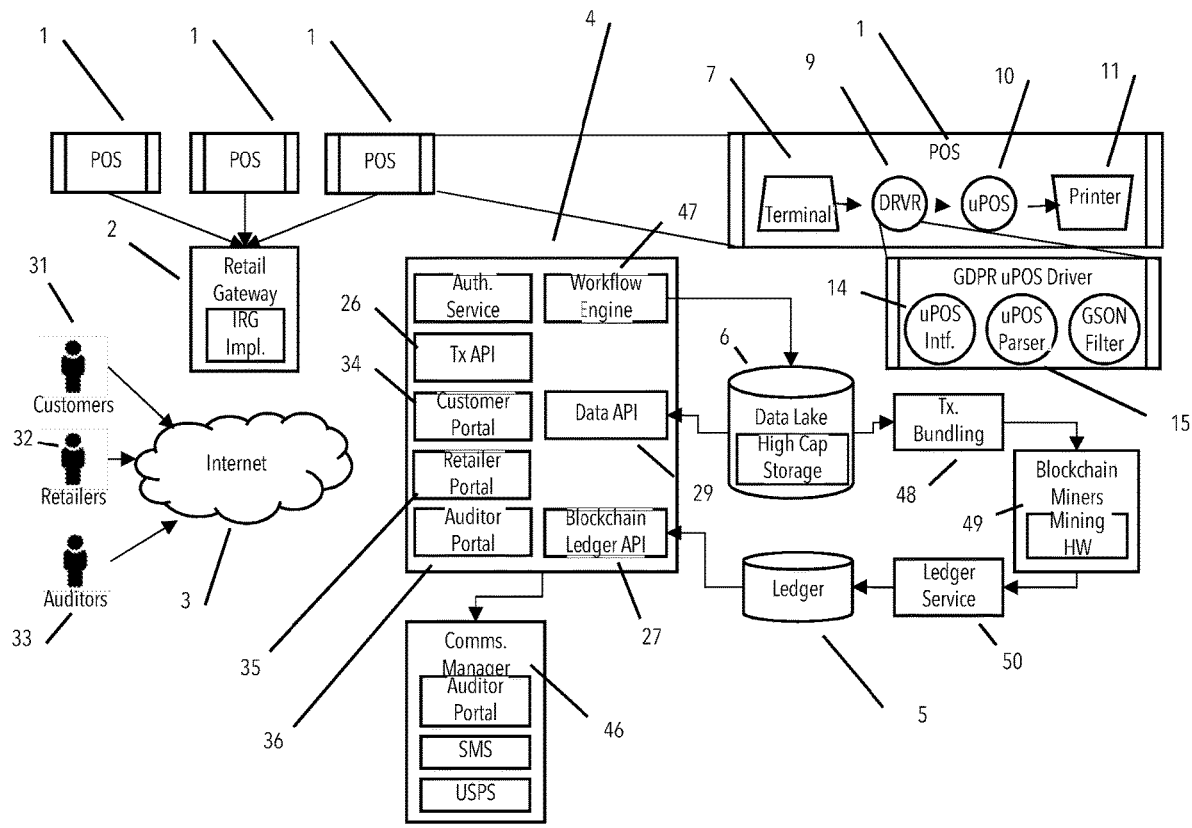
FIG. 9 illustrates the present invention in a preferred system of operation.

FIG. 9 shows an overall illustration of the present system in operation. Additional features in the system of FIG. 9 include communication manager 46 which provides automated communications to data subjects 31 to notify them of any changes, additions or deletions to the data elements kept in immutable ledger 5 or data lake 6. Communication services provided by communication manager 46 can include, but are not limited to, texts, emails or even postal or courier mailings. Automated compliance server 4 can optionally include a workflow engine 47 that provides the data configuration for the data processing steps required to correctly process each of the transactions. A transaction bundling software system 48 is a system within the blockchain platform that prepares data blocks received from automated compliance network appliance 2 into blocks of data that can be hashed and written to the immutable ledger 5 by the blockchain miners 49. Lastly, ledger service 50 can be a set of APIs that provide miners 49 with a standard set of functions that they can execute against immutable ledger 5 to add the blocks to immutable ledger 5.

In optional preferred aspects, the present system automatically detects non-compliance or other activities using daemons (i.e.: programs running in the background without user involvement or control), event registries or other systems. For example, daemon applications can include simple logic scripts, predictive or descriptive analytics, or machine learning models. Daemon applications would view events on the registry, and may be triggered to act when certain events occur (e.g.: adding a new block to the blockchain). Alternatively, daemon applications can continuously scan the registry to look for patterns and alert stakeholders when certain registry states are detected (e.g.: an unusual number of subject access requests (SAR requests) or an increasing delay in responding to SAR requests). In yet other alternative versions, the daemon applications may be manually triggered by end users. Preferably, the daemon applications are resident in the automated compliance network appliance, or the compliance device driver.

In these alternate embodiments in which daemon applications are used, the daemon applications can provide a continuous form of audit that verifies the rules of compliance. For example, daemons could provide warnings of activities that could indicate a data breach or a high probability of impending non-compliance. Tracking the time to respond to SAR requests would be an example, with increasing response periods indicating a potential problem. The daemon applications may be programmed to send alerts, warnings, scripts, remote procedure calls, etc. when they detect an event.

In further embodiments, an event registry is used to provide a list of historic non-compliance or other key events. Such events can optionally be "virtual" events generated by auditors. The event registry can identify events that are associated with specific stakeholders on the registry. Optionally, such identified events can be used to train machine intelligent daemons to identify patterns of compliance activity. For example, the events can be paired with pre-dated registrations (and be reduced to a tensor data structure to train machine intelligence) to recognize patterns on the registry, and predict the probability of these patterns arising.

Probability thresholds may also be used in conjunction with probability thresholds. For example, after the daemon application detects an event, the probability of the event can be calculated by the daemon. Should an event be detected which has a low probability of occurring, then the daemon may be programmed to take a certain action. Conversely, should the event be detected, but the daemon recognizes that its occurrence is highly likely, then no action needs to be taken.

What is claimed is:

1. A computer system architecture for providing compliance with data regulations, comprising:
   (a) a data collection terminal configured to receive a data input stream;
   (b) a data input device resident in the data terminal;
   (c) a data output device resident in the data collection terminal;
   (d) a compliance device driver resident in the data collection terminal, the compliance device driver comprising a non-transitory computer-readable medium having instructions stored therein that when executed by a computing device:
      (1) selects data in the data input stream received by the data input device that corresponds to pre-identified data fields, wherein the pre-identified data fields are determined by data compliance regulations, and
      (2) applies a compliance markup language parser to the selected data, thereby generating pseudonymized data; and
   (e) an automated compliance network appliance in communication with the compliance device driver, wherein the automated compliance network appliance is a physical network interface connection comprising a processor, memory and local storage, the automated compliance network appliance:
      (1) receiving the pseudonymized data generated by the compliance driver, and
      (2) transmitting the pseudonymized data in batches to blockchain miners; and (3) receiving the data input stream from the data collection terminal, and (4) transmitting the data input stream to the Internet; and (f) an automated compliance server, the automated compliance server:

(1) receiving the data input stream from the Internet, and (2) storing the data input stream in a data lake, (3) receiving blockchain blocks from miners, and (4) storing the blockchain blocks in an immutable audit leger that certifies that data stored in the data lake is correct and unaltered.

2. The computer system architecture of claim 1, wherein the data collection terminal is a point of sale terminal, a webpage, a cash register, a check-in counter, a hand-held mobile device, or an API.

3. The computer system architecture of claim 1, wherein a USB drive or a router provides a network interface connection.

4. The computer system architecture of claim 1, wherein the pre-identified data fields are pre-stored in the compliance device driver.

5. The computer system architecture of claim 1, wherein the pre-identified data fields comprise personal information data fields.

6. The computer system architecture of claim 1, wherein the pre-identified data fields correspond to privacy data regulations.

7. The computer system architecture of claim 1, wherein the immutable audit ledger utilizes a private blockchain.

8. The computer system architecture of claim 7, wherein the private blockchain is a proof of complexity blockchain.

9. The computer system architecture of claim 1, wherein an automated compliance application server hosts a portal for accessing the data stored in the data lake.

10. The computer system architecture of claim 9, wherein the portal allows a data subject to:

delete data about themselves stored in the data lake, modify data about themselves stored in the data lake, or transfer data about themselves stored in the data lake.

11. The computer system architecture of claim 1, wherein an automated compliance application server hosts a portal for accessing the data in the immutable audit ledger.

12. The computer system architecture of claim 1, wherein the data output device provides data in data input stream to the person about whom the data has been collected.

13. The computer system architecture of claim 1, wherein the compliance markup language parser determines which data is to be sent to the data output device.

14. The computer system architecture of claim 1, wherein the data collection terminal is payment cardholder information (PCI) complaint.

15. The computer system architecture of claim 1, further comprising:

a daemon application for detecting registry events and identifying non-compliance activity.

16. The computer system architecture of claim 15, wherein the registry events are subject access requests.

17. The computer system architecture of claim 15, wherein the daemon application generates probability thresholds of the registry events and provides a warning when the probability thresholds have been crossed by the registry events.

18. A method of providing an auditable record showing transaction compliance with data regulations, comprising:

(a) collecting a data input stream with a data collection terminal;

(b) selecting data in the data input stream that corresponds to pre-identified data fields, wherein the pre-identified data fields are determined by data compliance regulations, and wherein the data are selected by a compliance device driver comprising a non-transitory computer-readable medium having instructions stored therein that when executed by a computing device selects the data;

(c) applying a compliance markup language parser to the selected data, and wherein the compliance markup language is applied by an automated compliance network appliance comprising a network interface connection having a processor, memory and local storage, thereby generating pseudonymized data;

(d) transmitting the pseudonymized data to blockchain miners;

(e) transmitting the data input stream into a data lake;

(f) receiving verified blockchain blocks from the blockchain miners;

(g) storing the verified blockchain blocks in an immutable audit leger that certifies that data stored in the data lake is correct and unaltered;

(h) hosting a portal for accessing data stored in the data lake; and (i) hosting a portal for accessing data stored in the immutable audit ledger.

19. The method of claim 18, wherein collecting the data input stream with the data collection terminal comprises collecting the data input stream with a point of sale terminal, a webpage, a cash register, a check-in counter, a hand-held mobile device, or an API.

20. The method of claim 18, wherein the portal hosted for accessing data stored in the data lake allows a data subject to access data about themselves, and delete, modify or transfer the data about themselves.

21. The method of claim 18, further comprising:

using a daemon application to detect registry events and identifying non-compliance activity.

22. The method of claim 21, further comprising:

the daemon application generating probability thresholds of the registry events and providing warnings when the probability thresholds have been crossed.

* * * * *